Nov. 11, 1952 L. MASSIOT 2,617,302
DEVICE FOR GAUGING THE WATER LEVEL IN THE
BOTTOM OF HYDROCARBON TANKS AND THE LIKE
Filed Jan. 17, 1948 4 Sheets-Sheet 1
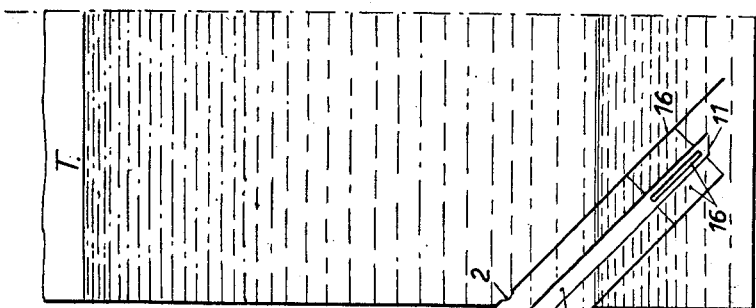
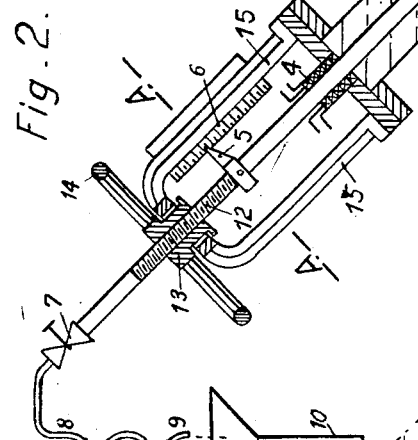
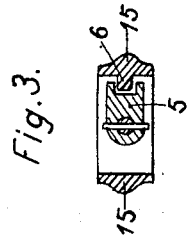
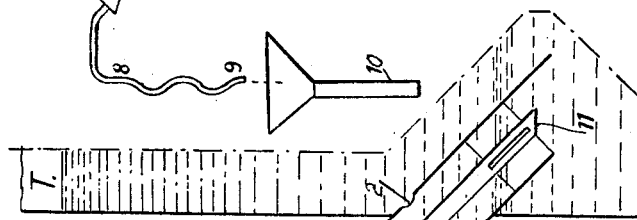
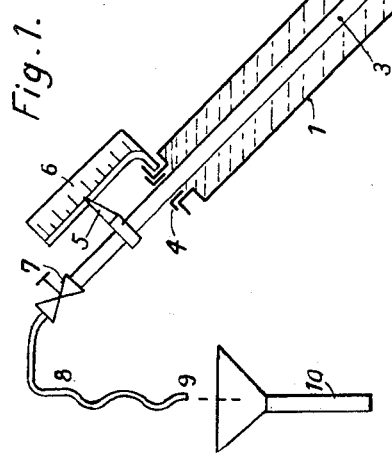
INVENTOR
Louis Massiot
BY
Blair, Curtis & Hayward
ATTORNEYS

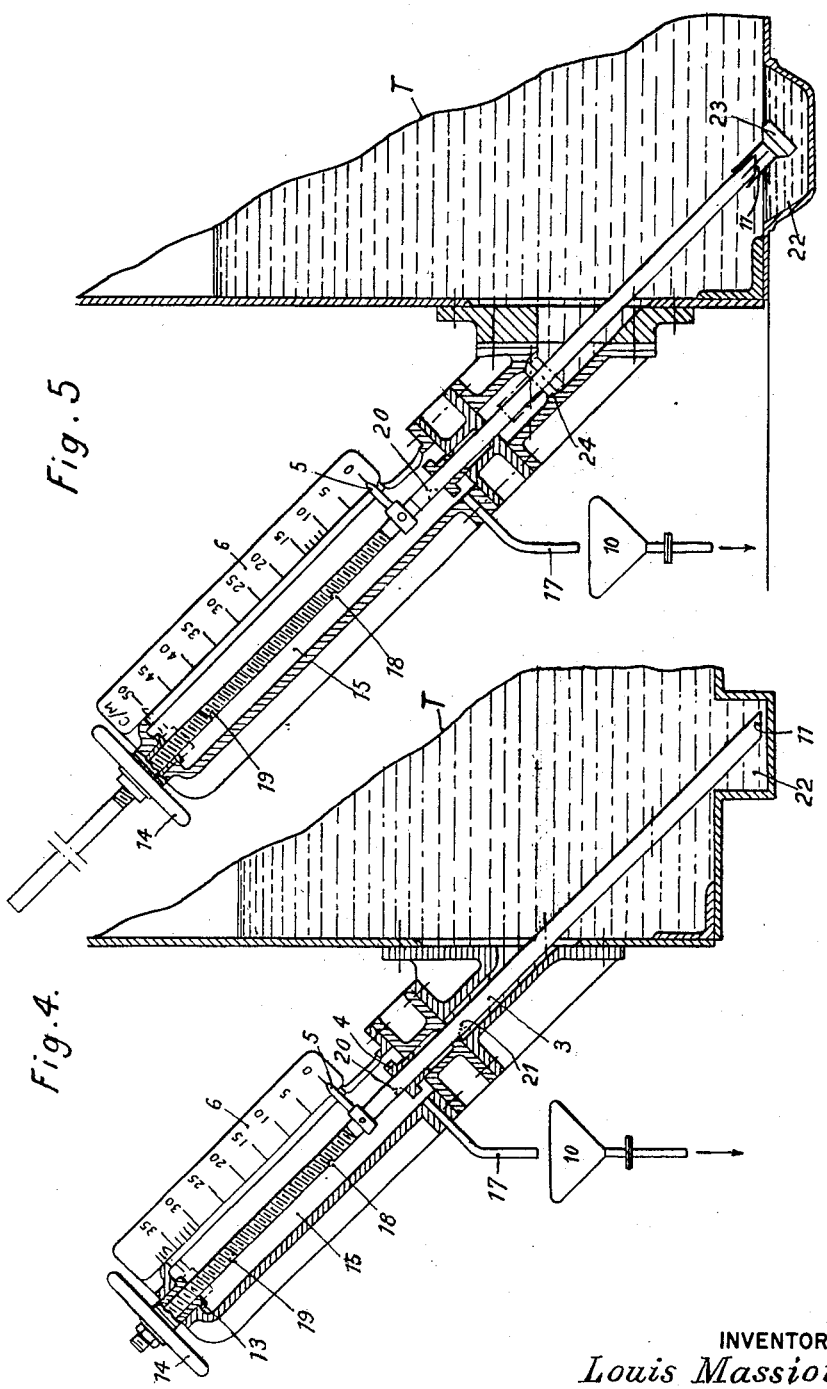

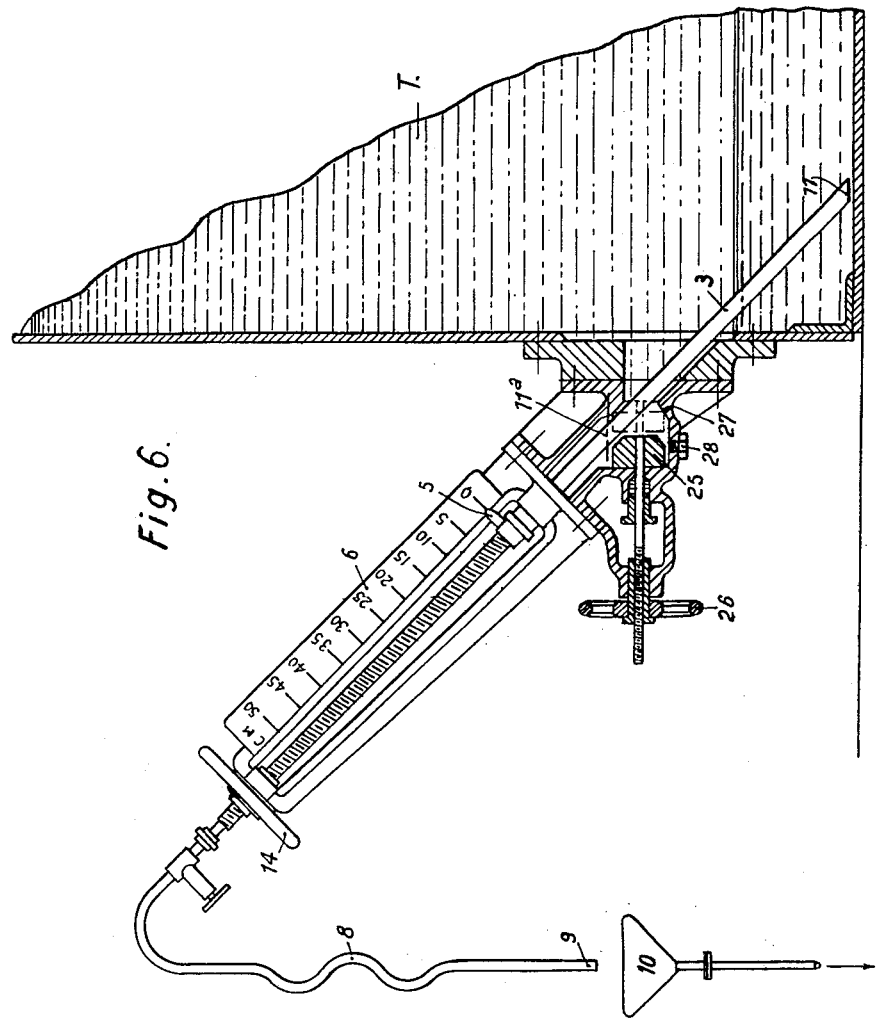

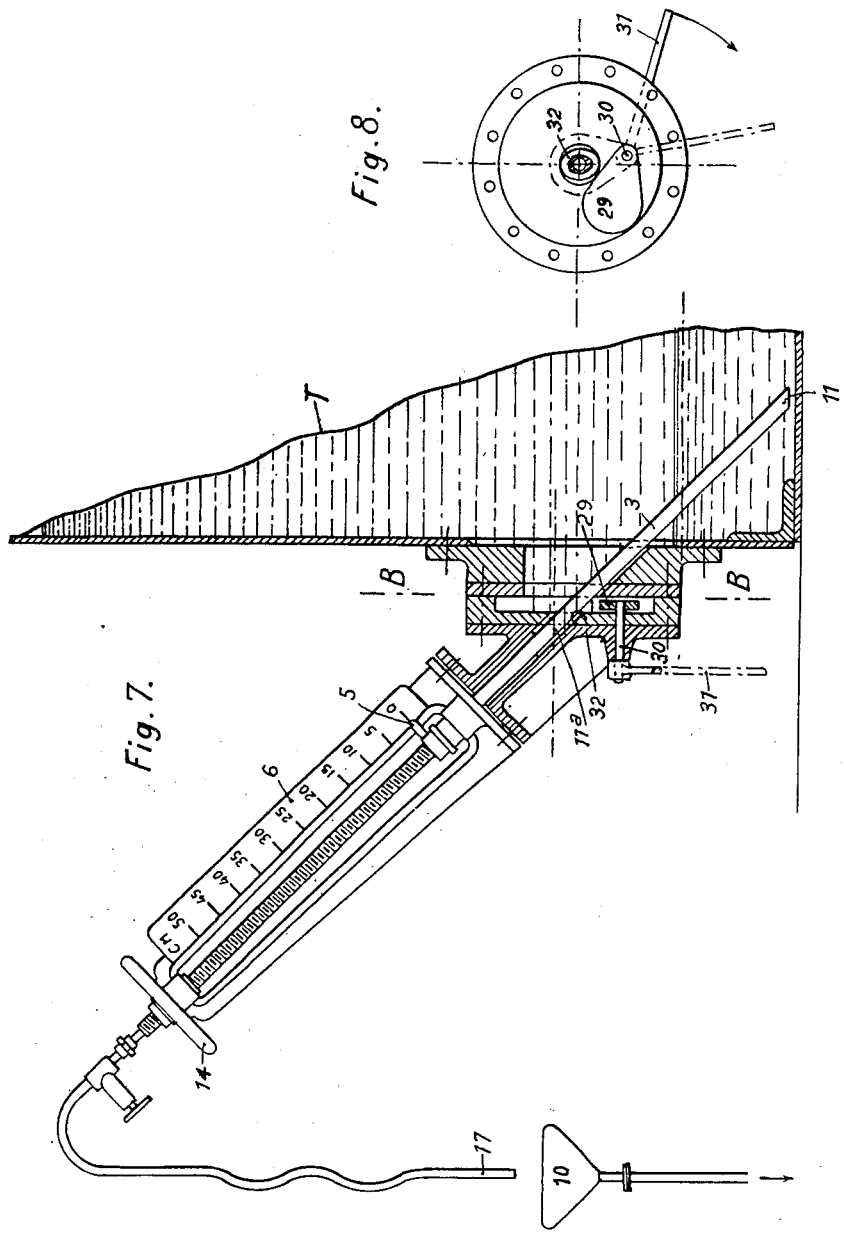

Patented Nov. 11, 1952

2,617,302

UNITED STATES PATENT OFFICE 2,617,302

DEVICE FOR GAUGING THE WATER LEVEL IN THE BOTTOM OF HYDROCARBON TANKS AND THE LIKE

Louis Massiot, Paris, France, assignor to Compagnie Francaise de Raffinage (Société Anonyme), Paris, France, a company of the French Republic Application January 17, 1948, Serial No. 2,952
In France June 23, 1947

4 Claims. (Cl. 73—298)

The storage tanks for hydrocarbons: gasoline, solvent, kerosene, gas-oil, etc., contain always a certain amount of water which collects at the bottom of the tank.

In order to know the exact volume of the hydrocarbon stored in the tank, as well as to know when the emptying of the tank has to be stopped so as to avoid withdrawing therefrom water instead of hydrocarbon, one has often to determine accurately the level of the hydrocarbon in the tank.

This is done usually by means of gauge cocks or by means of a gauge-glass. These devices, besides their common drawback, which consists in presenting on the outer wall of the tank tubes of relatively small diameter exposed to shocks and liable to breakage, present other inconveniences peculiar to each of them: the gauge cocks cannot give the desired level indication with sufficient accuracy as this latter is limited by the distance between two successive cocks; and the gauge-glass, while giving this indication with adequate accuracy, is exposed not only to breakage by shock, as the gauge cocks, but also to breakage by water congelation at freezing temperature.

The present invention has for its object to provide a gauging method of the above defined type, which will avoid all these drawbacks and inconveniences and which will be adaptable to all liquids lighter than water, insoluble therein, and normally immiscible therewith.

It has also for its object devices for carrying out this improved method.

Essentially the method according to the present invention consists in withdrawing a liquid sample from the bottom of the tank in the form of a continuous small discharge and by means of a movable sounding-tube, while lifting progressively this movable tube away from said bottom; in observing when this tube stops discharging water and starts discharging hydrocarbons or other lighter-than-water liquid; in stopping then the lifting of said tube; and in measuring the lift thus effected to determine the corresponding depth of water in the bottom of said tank.

A preferred embodiment of the device for carrying out the method of the invention comprises essentially a gauge-tube, or sounding-tube mounted near the bottom of the tank, preferably with a certain inclination, and capable of sliding along its own axis through a stuffing-box. An index is fixed on the part of said tube, which remains constantly outside the tank, and said index moves opposite a fixed graduated scale so as to allow for measuring the axial displacements given to the said gauge-tube. In practice, this gauge-tube is preferably mounted coaxially within a tubular envelope or casing of relatively large diameter, branched on the tank near the bottom thereof.

An embodiment of said device and different modifications of said embodiment are shown, as examples in the accompanying drawings, in which:

Fig. 1 is a section, more or less schematic, showing the essential features of this device;

Fig. 2 is a longitudinal section of said embodiment;

Fig. 3 is a section made along line 3—3 of Fig. 2;

Figs. 4 to 7 are longitudinal sections similar to Fig. 2 and showing different modifications of said embodiment; and Fig. 8 is a vertical section made along line 8—8 of Fig. 7.

As shown in Fig. 1, the device comprises essentially a cylindrical casing 1 of relatively large diameter (for instance about 100 mm.). This casing is tightly secured at an angle of about 45° to the side wall of the tank T with its lower open part dipping into the tank close to the bottom thereof and provided with a hole 2 insuring that the level of the hydrocarbon is the same in the casing and in the tank.

A coaxial sounding-tube 3, of relatively small diameter, is slidably mounted in a stuffing-box 4 closing the upper end of the casing 1. The axial travel of this tube 3 with respect to the fixed casing 1 is adapted to correspond to the maximum water depth to be measured. An index 5, carried by the sounding-tube 3, moves therewith with respect to a fixed graduated scale 6, secured to the upper end of the casing 1.

A cock 7 is mounted on the upper end of the sounding-tube 3, while the open lower end thereof can be slid from the bottom to the top of the water contained in the bottom of the tank I.

A compound rigid and flexible pipe 8 leads the liquid flowing out of the cock 7 to an open mouth 9, from where it falls into a funnel 10.

The operation of this device is as follows:

The sounding-tube 3, being in its lowermost position, one opens the cock 7. As the level of the hydrocarbon in the tank T is higher than the top of the pipe 8, water starts then to flow into the funnel 10.

One slides then the sounding-tube obliquely upwards, while constantly checking the nature of the liquid flow out of 9. When small quantities of hydrocarbon appear together with the water, one knows that the lower open end of the sounding-tube has reached the level of separation of the two superposed liquids, i. e. water and hydrocarbon. One reads then directly the depth of the water contained in the tank T on the graduated scale 6 opposite the index 5.

The device just described presents the following advantages over the known devices:

1. It is very accurate, especially if one bevels horizontally the lower open end of the sounding-tube 3, as shown at 11 in Fig. 1.

2. If one is careful, between measurement periods, to return the sounding-tube to its lowermost position, the leaking or even the breaking of the cock 7—constituting the only relatively fragile part of the device—will produce only a loss of water and give time to remedy the situation before any hydrocarbon starts to leak.

3. The relative position of the casing 1 with respect to the tank T is such that it is constantly filled with hydrocarbon and therefore not subject to freezing.

4. If, after each measuring operation, one is careful to lift first the sounding-tube until some hydrocarbon starts to flow and to close the cock before one lowers said tube back in its position of rest, this tube also will remain filled with hydrocarbon and therefore not subject to freezing.

In practice, the schematic device just described may take the form of different embodiments which include preferably the progressive displacement of the sounding-tube, for instance by means of a screw system, and which comprise complementary auxiliary devices of safety.

Some of these possible embodiments will now be described as illustrative examples.

In the one shown Figure 2, the sounding-tube 3 is threaded as at 12 to receive a nut 13, provided with a hand-wheel 14. This nut is rotatably mounted in a bracket 15 fixed on the upper end of the casing 1 around the stuffing-box 4. On the other hand, the sounding-tube 3 is prevented from turning in said stuffing-box 4 by means of a slider 5, secured thereon in any suitable manner and having the U-shaped cross-section shown Fig. 3. The two branches of this U form an index and saddle a graduated scale 6 carried by the bracket 15. It will thus be seen that the sounding-tube 3 can be moved axially by manual rotation of the hand-wheel 14. The beveled lower end 11 of the sounding-tube 3 is provided with four straightening fins 16 preventing it from bending under its own weight and acting as sliding guides along the inner periphery of the casing 1.

In the modification shown in Figure 4, two supplementary conditions are realized, i. e.: the elimination of any outer piping between the upper end of the sounding-tube 3 and the funnel 10, and the elimination of any communication between the tank T and the atmosphere when the sounding-tube is in its lowermost position of rest.

The first of these conditions is realized by the fact that the support or bracket 15 is tubular and forms here a chamber provided at its lower end with a discharge pipe 17 and simply split longitudinally along its upper generatrix to give passage to a finger-shaped index 5. The liquid contained in the sounding-tube 3 is admitted into this chamber 15 through an orifice or port 18 pierced in the wall of the tube 3. The position shown at 18 is the middle position of said port. Its extreme positions, corresponding respectively to the uppermost and the lowermost positions of the sounding-tube 3, are shown at 19 and 20.

The second condition is realized by the fact that the lower end of the sounding-tube may be brought to a level slightly lower than the bottom of the tank T, the supplementary downward travel thus obtained being sufficient to bring the port 18 into a lowermost position 21 located below the stuffing-box 4. This obviously necessitates the provision in the bottom of the tank T of a small cup 22 to allow for this supplementary travel of the sounding-tube.

The modification of Figure 5 is identical to the embodiment of Figure 4, with the exception that the communication between the tank and the atmosphere through the pipe 3, the chamber 15 and the discharge tube—instead of being cut in the lowermost position of rest of the sounding-tube by the slide-valve action of this latter—is cut in the uppermost position of the tube 3 by means of a valve 23, carried at the lower beveled end 11 of said tube 3 and cooperating then with a valve-seat 24. The provision of a cup 22 in the bottom of the tank T is still here necessary to lodge the valve 23 when the beveled edge 11 is substantially flush with the inner bottom of the tank T.

In the modification of Figure 6—in which the liquid is discharged through a rigid and flexible pipe 8 as in Figures 1 and 2—this cutting of the communication between the tank T and the atmosphere in the uppermost position of the sounding-tube, when the beveled edge 11 reaches the level 11$^a$—is obtained by means of a manual valve 25 which can then be brought, by means of a hand-wheel 26, against a valve-seat 27.

A stopper 28 allows for emptying the body of the valve 25, 27, when there exists a risk of freezing due to the fact that the water level in the tank reaches this body.

In the modification of Figures 7 and 8, the role of the manual valve 25 is played by a butterfly valve 29, pivoted at 30 and which can be manually swung by means of a lever 31 so as to cover an opening 32 when the beveled edge 11 is in its uppermost position 11$^a$.

I claim:

1. A device for determining the level of the interface of two immiscible liquids present in an opaque tank which comprises a strong rigid casing mounted at a pre-determined oblique angle in an aperture in the side wall of said tank near the bottom thereof; a rigid sounding tube slidably mounted in said casing and adapted for axial movement within said casing; a stuffing box on the upper portion of said casing adapted to prevent liquid leaking from said tank; valve-means on said tube to control and regulate the efflux of liquid from said tank through said tube; an indicator fixedly mounted on said tube; a bracket mounted on the upper portion of said casing; a scale mounted on said bracket and adapted to engage said indicator and prevent rotation of the sounding tube; said sounding tube being threaded at its upper portion and in engagement with corresponding threads of a hand wheel mounted on said bracket whereby rotation of the hand wheel results in axial movement of the sounding tube to bring said indicator to a rest position opposite said scale; said rest position being the point where the effluent liquid changes in character as the sounding tube is obliquely displaced; and said rest position directly indicating the vertical height of the lower liquid layer in the tank.

2. A device for determining the interface between two immiscible liquids in an opaque tank which comprises a rigid casing mounted at a pre-determined oblique angle in an aperture in the side walls of said tank near the bottom thereof; a rigid sounding tube slidably mounted in said casing and adapted for axial movement within said casing; said tube passing through a stuffing box on an upper portion of said casing; said tube also being threaded at its upper portion; said tube further being sealed at its upper extremity but having a liquid discharge orifice so positioned on the tube that at the lowermost position of the tube said orifice is below the stuffing box; a bracket defining a chamber mounted on the upper portion of the casing; said bracket being surmounted by a rotatable threaded hand wheel in engagement with the upper threaded portion of the tube so that rotation of the hand wheel causes axial movement of the tube; and indicator and scale means mounted respectively on the tube and the bracket so that the liquid interface position is directly indicated by the determined rest position of the indicator on the scale.

3. A device according to claim 2 with the addition of a cap on the lower extremity of the tube, said cap engaging a valve-seat in said casing at the uppermost position of travel of said tube thereby preventing efflux of liquid from the tank at said position.

4. A device according to claim 2 with the addition of a manual valve on the casing so positioned as to permit the sealing off of the efflux from the tank at the uppermost position of the tube; and means to drain the casing and tube when said tube is in its uppermost position.

LOUIS MASSIOT.

REFERENCES CITED

The following references are of record in the file of this patent:

UNITED STATES PATENTS

| Number | Name | Date |
|---|---|---|
| 1,521,668 | Bond | Jan. 6, 1925 |
| 2,187,210 | McDonald | Jan. 16, 1940 |
| 2,267,221 | Roney | Dec. 23, 1941 |

FOREIGN PATENTS

| Number | Country | Date |
|---|---|---|
| 308,939 | Germany | Sept. 2, 1917 |